United States Patent Office 3,523,227
Patented Aug. 4, 1970

3,523,227
CONTROL SYSTEMS FOR MACHINE TOOLS
Alexander Russell, Glasgow, Scotland, assignor to National Research Development Corporation, London, England, a British corporation
Filed Jan. 3, 1968, Ser. No. 695,460
Claims priority, application Great Britain, Jan. 4, 1967, 499/67
Int. Cl. G05b 19/38
U.S. Cl. 318—594          12 Claims

ABSTRACT OF THE DISCLOSURE

System for point-to-point control of a tool in a machine tool along either of two perpendicular rectilinear paths by means of digital form instructions on punched tape in which a digital form signal from the destination component of the instruction is compared with a digital form position signal derived from position transducer means coupled to the movable tool to generate an error signal used to control an electric motor driving the tool towards the destination position and in which upon arrival of the tool in the vicinity of the destination, control of said motor is transferred to an analogue form holding signal provided by the transducer means and whose amplitude passes through zero value when the tool is at the midpoint of the unit division of displacement defined by the signalled value of the least significant digit of the position component of the instruction.

---

This invention relates to control systems for machine tools and is more particularly concerned with a system for providing point-to-point control by digital-form information of a machine tool such as a turning lathe. The invention is particularly suitable for use with absolute displacement transducer arrangements as described in co-pending patent application No. 570,526, filed Aug. 5, 1966, hereinafter referred to as the "first co-pending application" and as also described in co-pending patent application No. 597,966, filed Nov. 30, 1966, hereinafter referred to as the "second co-pending application."

Among the objects of the invention is the provision of an improved control system which is economical in its apparatus requirement and is consequently relatively inexpensive to instal, which does not require the use, either intermittently or continuously, of a computer and in which the necessary programme of input digital information can be compiled by a relatively inexperienced person. The arrangements of the invention are particularly suitable for use when a lathe is employed for the small batch production of turned parts each of which requires the performance of a number of simple point-to-point straight cuts along two orthogonal axes and when the required number of such turned parts is such that production under purely manual control would be tedious and wasteful whereas the setting up of a completely automatic machine would be uneconomic.

Broadly in accordance with the invention the control system is arranged to operate with an instruction in digital form which defines, for each individual step, the axis of tool movement, the ultimate destination point of the tool relative to a fixed datum position and a limit speed for tool movement, the arrangement being such that, for each operation step, after selection of the axis of tool movement by the instruction, tool movement along such axis is initiated and is accompanied by continuous comparison of a digital-form output signal, which is provided by an absolute displacement position transducer system associated with such movement axis and which indicates the instantaneous tool position, with the destination point component of the instruction until equality is approximately achieved at which instant control of the tool moving means for such axis of movement is transferred to an analogue output signal which is derived from the least significant digit section of an encoder of said transducer system and which passes through a predetermined datum level of amplitude, e.g. zero, when the tool is in the exact position as defined by the value of the least significant destination digit of the instruction thereby to hold the tool position as regards movement along such movement axis while a subsequent instruction which is concerned with tool movement along the other movement axis, is dealt with in like manner.

The above and other features of the invention will be better understood from the following description of two practical embodiments which will now be given by way of illustrative example only and with reference to the accompanying drawings in which:

FIG. 1 comprises a series of electric waveform diagrams showing different signals present in the absolute displacement transducers forming part of the illustrated embodiments of the invention.

FIG. 2 is a circuit diagram of a part of the displacement transducer.

FIG. 3 comprises a further series of electric waveform diagrams illustrating the manner of operation of said displacement transducer.

FIG. 6 is a diagram in block schematic form, of the complete arrangements of a control system in accordance with the invention for effecting point-to-point control of the position of a machine tool along each of two perpendicular movement axes, while

In the embodiments of the invention about to be described, the position and displacement movement of a tool e.g. a lathe-tool, along each of two, mutually perpendicular, movement directions of X (longitudinal axis) and Y (transverse axis) are continually monitored by an absolute positional transducer system as described in detail in the aforesaid second co-pending application and in which for each movement direction, an optical grating having a plurality of parallel tracks, whose unit division dimensions are decimally related and range from 0.001 inch to 10 inches, co-operate with photoelectric reading means to provide from each track a pair of voltage signals which alternate in polarity with a sinusoidal or seriesoidal waveform over one complete cycle for a tool movement equal to one grating division and which are 90° phase displaced relative to one another. From the leading one of these signals is derived a third, 180° phase-displaced, signal. Thus the first or finest grating track of such transducer having a unit division dimension of 0.001 inch provides three output signals which alternate in polarity over one complete cycle for each 0.001 inch of movement of the tool. Similarly, from the second track a second group of three, 0°, 90° and 180° phase-displaced signals alternate over one complete cycle for each 0.01 inch of movement of the tool and so on.

Figure 1:
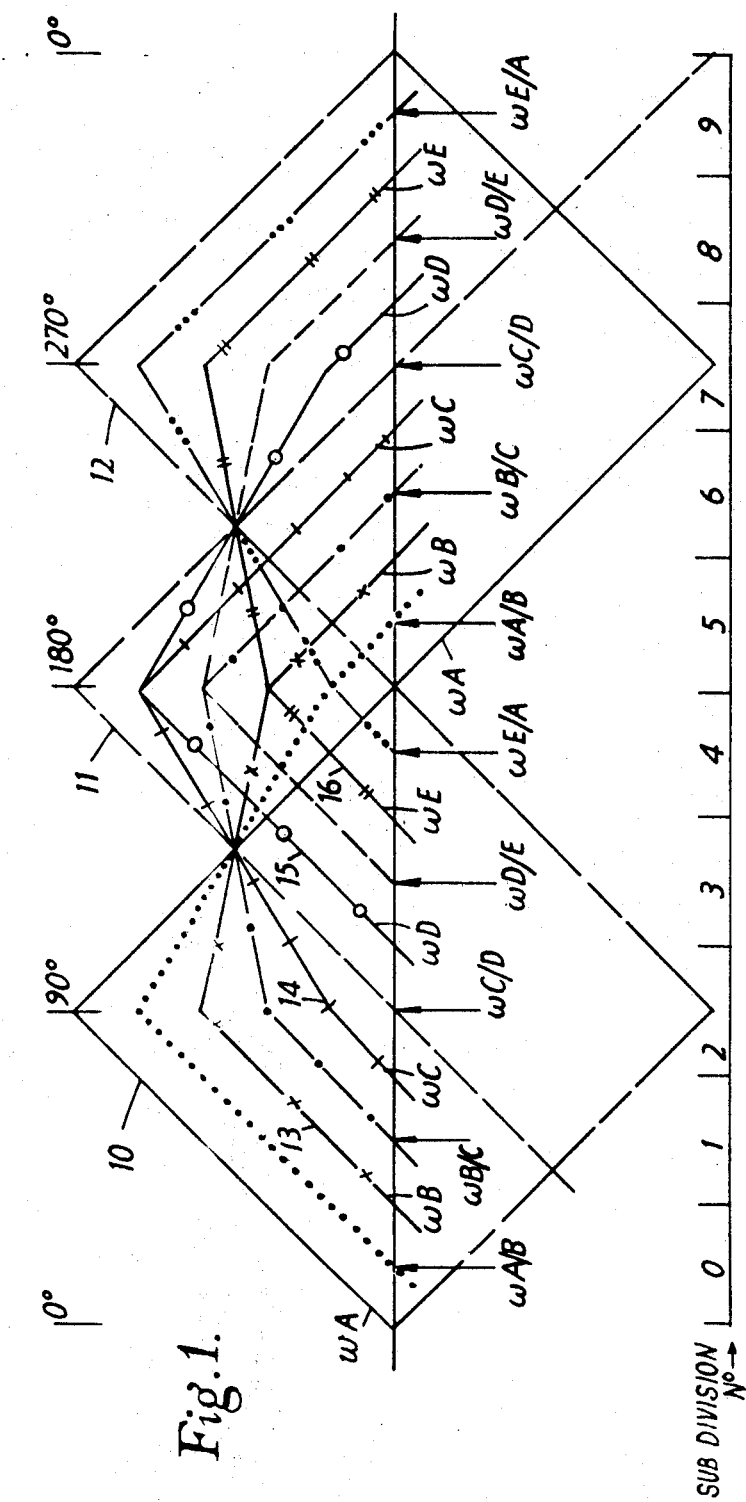
Figure 3:
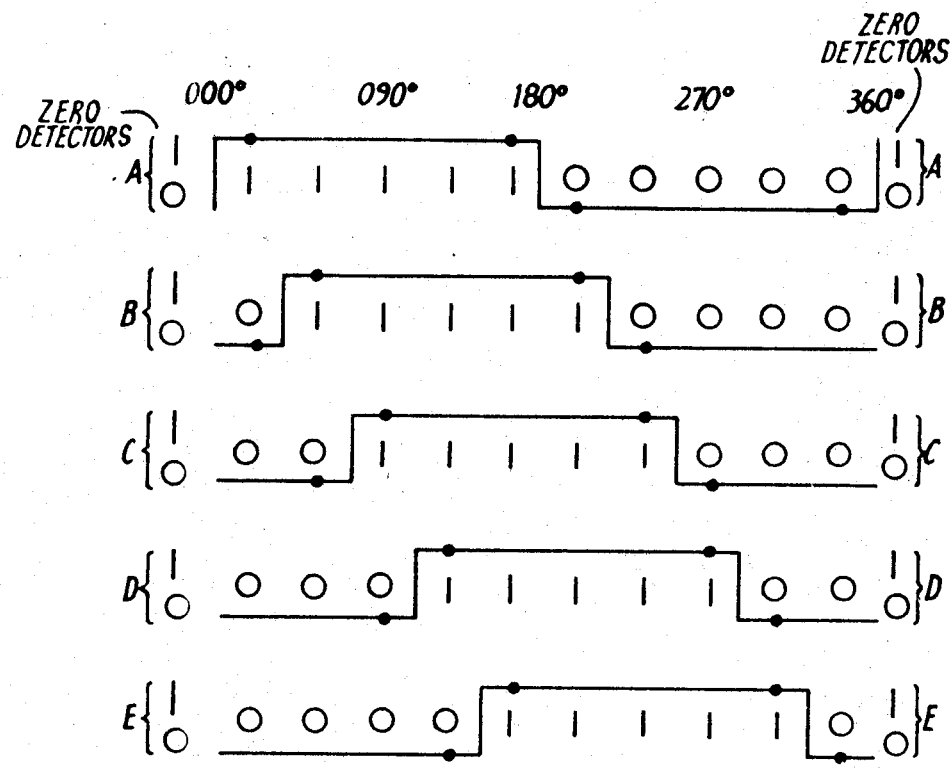
Figure 4:
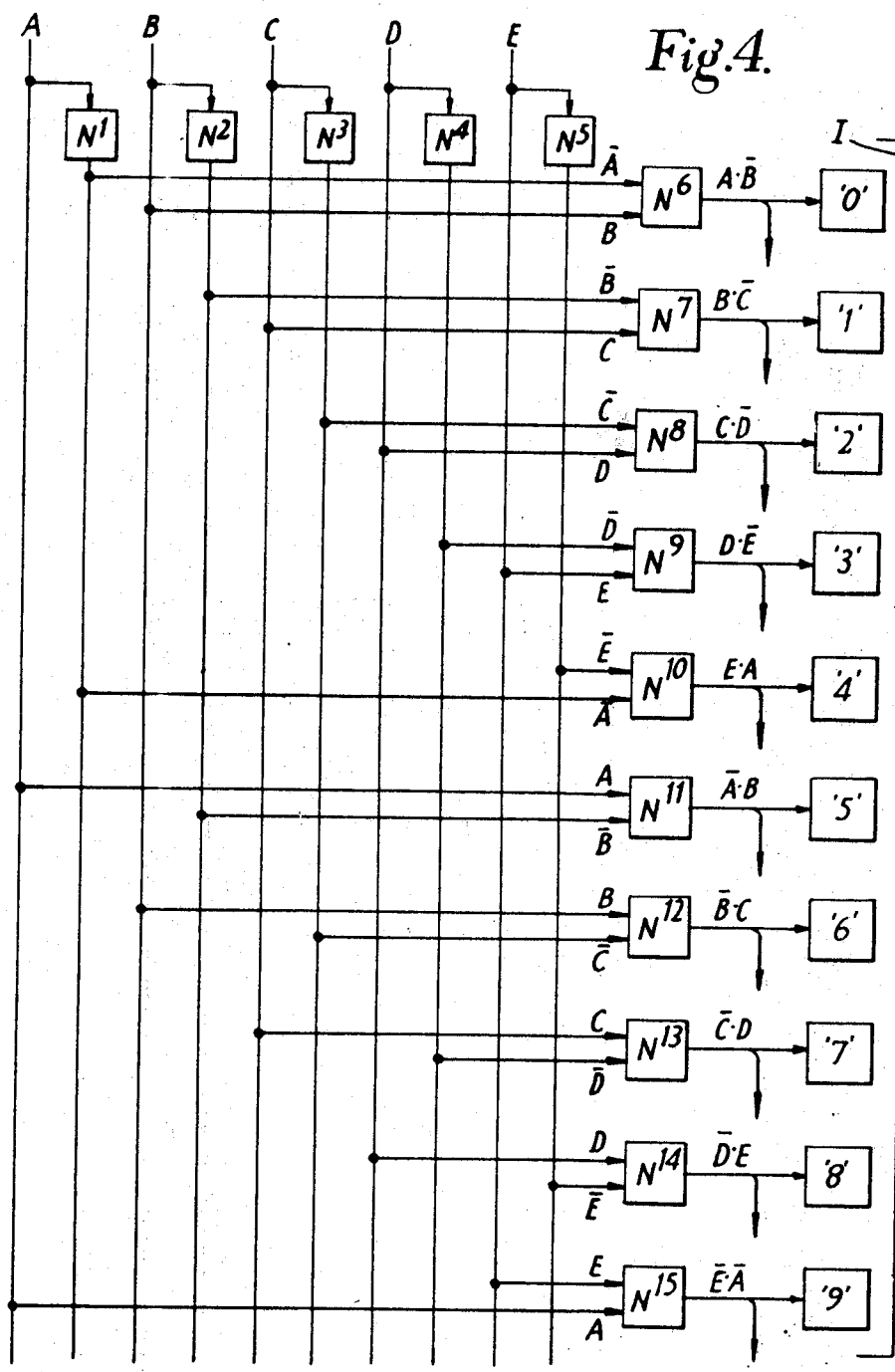
FIG. 4 is a block schematic diagram of the decoder arrangements of said displacement transducer.

FIG. 1 shows at 10, 11 and 12 typical examples of such three signals phase-displaced by 0°, 90° and 180°. By application of these three signals to the respective terminals 10a, 11a, 12a of a multi-tapped potentiometer network as shown at TPN in FIG. 2, there can be derived a family of generally similar waveforms as indicated at 13, 14, 15 and 16, in FIG. 1. These signals which are phase-displaced by intervals of 36°, serve to define, in conjunction with the signal 10, each of ten equal subdivisions of each unit division of the grating track. As described in the aforesaid first and second co-pending applications, from such family of phase-displaced waveforms outputs wA, wB, wC, wD and wE (FIG. 2) there are derived five equivalent zero detect waveforms as shown at A, B, C, D and E in FIG. 3. Each of these zero detect waveforms is at active level for 180.° of the grating division movement and each wave is 36° phase-displaced relative to its immediate neighbours. Such zero detect waveforms A, B . . . E are applied to a decoder of the form shown in FIG. 4. Such decoder comprises a series of solid-state logical NOR circuits N1 . . . N15 which, by examination of selected combinations of said zero detect waveforms A . . . E, provide output signals defining respectively the different ones of the ten subdivisions of each unit division of each grating track. These signals may be employed to operate a visual indicator such as a ten-lamp device, indicated collectively at I, and provide also a digital form output signal representing the instantaneous position of the tool for comparison with the destination instruction. Thus the output $\overline{AB}$ is energised whilst the tool is in subdivision "0" of any unit division of the grating output $\overline{BC}$ is energised whilst the tool is in subdivision "1" of any unit division of the grating and so on.

Figure 2:
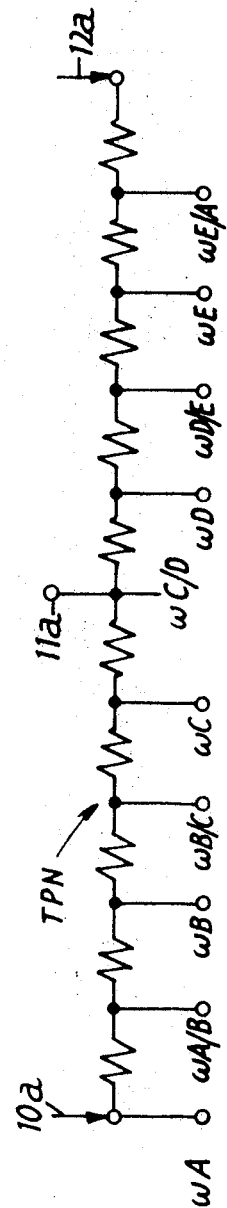

The arrangements so far described are in accordance with those described in detail in the aforesaid first and second co-pending applications but for the purpose of providing additional analogue control signals for holding the tool positive at a set value on one movement axis while controlled movement of the same tool is effected along the other axis, a second family of phase-displaced waveforms is derived from intermediate tapping points on the particular resistive network (TPN, FIG. 2) which is associated with the finest division grating, i.e. the least significant digit section. Such phase-displaced waveform outputs are shown in FIG. 2 at wA/B, wB/C, wC/D, wD/E and wE/A. These waveforms are also shown in FIG. 1 from which it can be seen that they each pass through a zero datum level of amplitude at the mid point of a different one of the ten sub-divisions, "0," "1" . . . "9," of the unit grating division.

Figure 5:
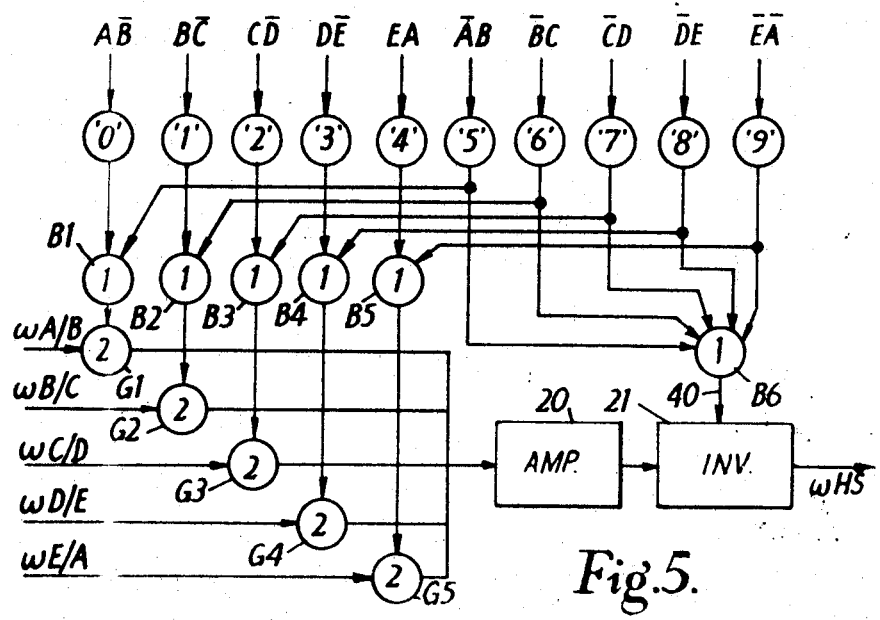
FIG. 5 is a block schematic diagram of additional means within the displacement transducer arrangements for selecting an appropriate molding control signal.

These intermediate point control waveforms are each applied, as shown in FIG. 5, to an associated AND gate G1, G2 . . . G5. These gates are controlled respectively by the outputs from buffer circuits B1, B2 . . . B5. The latter are, in turn, each supplied with two alternative control inputs derived from the division indicating output signals from the decoder of the least significant digit section. Thus, the buffer circuit B1, whose output controls the gate G1 governing the supply of the intermediate point control waveform wA/B, is applied with the "0" division indicating signal $\overline{AB}$ and with the "5" division indicating signal $\overline{AB}$. Similarly buffer circuit B2 controlling gate G2 in the supply path of waveform wB/C is supplied with the "1" divsion indicating signal $\overline{BC}$ and with the "6" division indicating signal $\overline{BC}$, and so on.

As will be seen from inspection of FIG. 5, gate G1 is open to pass the analogue point control waveform wA/B when the least significant digit value of the number indicating the instantaneous tool position is either "0" or "5" while gate G5 is open to pass waveform wE/A when the digit value is either "4" or "9" and so on.

The outputs from all of the gates G1, G2 . . . G5 are fed collectively to an amplifier 20 which may be of any suitable well known form. The amplifier output is then passed through a signal-controlled inverter 21 to form the final tool holding signal uHS. The signal-controlled inverter operates either to pass the applied input signal with unaltered phase when no signal is applied to its control input 40 or, when such control input is energised, to reverse or invert the phase of such input signal. Such inverter may comprise alternative signal transmission paths, one introducing an additional 180° phase shift, which paths can be made operative alternatively by appropriate biasing or unbiasing of control gates by the control input signal on input 40. The signal-controlled inverter 21 is controlled at input 40 by each of the position signals of values "5," "6" . . . "9" fed by way of a buffer circuit B6 so as to cause the amplifier output signal to be inverted whenever the tool is in any one of the subdivision positions between "5" and "9" and to leave the amplifier output unaltered whilst the tool position is in any one of the sub-divisions between "0" and "4."

Figure 6:
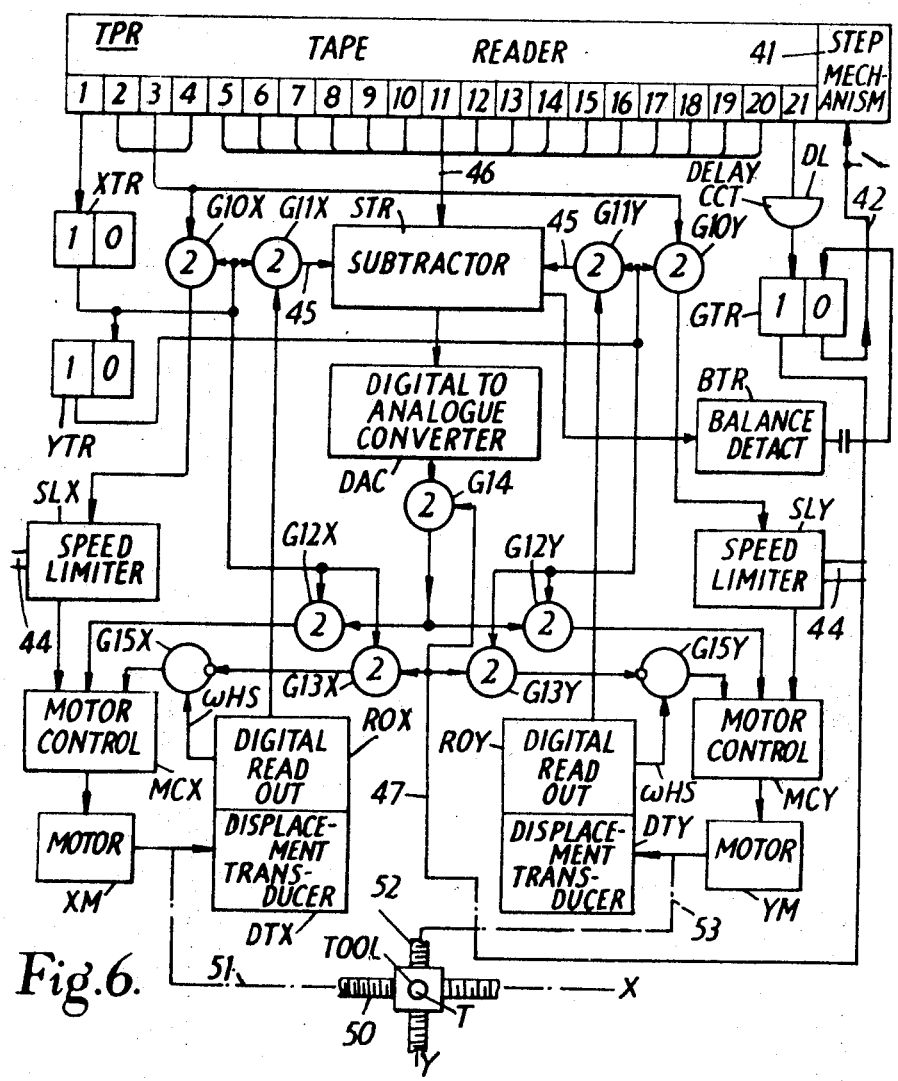

The complete apparatus arrangement of the control system are shown schematically in FIG. 6 where T denotes the machine cutting tool movable along an X axis by means of a screwed shaft 50 rotatable through gearing indicated schematically by the cham-dot line 51 by a reversible electric motor XM, and also movable along a Y axis at right angles to the X axis by means of a further screwed shaft 52 which is rotatable through gearing indicated by the cham-dot line 53 by another similar reversible electric motor YM. TPR indicates a punched paper tape reader operative with punched tape having twenty-one bits or channels 1 . . . 21. Tape channel 1 signals the tool movement axis, the presence of a punching denoting the X axis and the absence of a punching, the Y axis. Channels 2, 3 and 4 collectively as a 3 binary digit number define the tool movement limiting speed. Channels 5–20 as four, four binary digit, groups define the respective four decimal digits specifying the required tool destination. Channel 21, by the presence or absence of a punching thereon, indicates whether or not a further operation step is to be performed. The tape reader may be of any convenient and already known form which is provided with signal controlled stepping means 41, such as a magnet operated ratchet mechanism, which can be energised over lead 42.

An output signal present in channel 1 of the tape reader TPR signifies an operation along the X axis and operates to set an X axis trigger circuit XTR from its normal quiescent "off" state to the "on" state. The "on" state output from this trigger circuit XTR provides a signal which serves to open X axis AND gates G10X, G11X, G12X and G13X. Such "on" state output signal also serves to reverse a Y axis trigger circuit YTR from its normal quiescent "on" state to its "off" state.

The opening of gate G10X allows the speed instruction signals in channels 2, 3 and 4 of the tape reader output to pass to a speed limiter circuit SLX which operates to define the maximum voltage available for supply to the electric driving motor XM controlling tool movement along the X-axis. The speed limiter circuit may be of any suitable known form. It may comprise, for example, three electrically operated switching means, such as relays or equivalent electronic devices each serving, when energised, to short-circuit resistance or impedance elements in series with the power supply to the motor over leads 44. By appropriate selection of resistance or impedance values controlled by the respective switches a range of eight different maximum speeds may be made available.

The opening of gate G11X allows the passage of digital form signals indicative of the instantaneous position of the tool along the X-axis from the read-out ROX of an absolute positional transducer system DTX which is of the form already described and which is associated with tool movement along the X-axis. From such gate G11X these signals pass to one input 45 of a digital signal subtractor unit STR whose other input 46 is simultaneously provided with digital form signals indicative of the destination position of the tool derived from the tape reader TPR and determined by the punchings in channels 5–20 of the tape. The substractor unit STR may be of any convenient and already known form. For example it may be constructed in the manner described in co-pending U.K. patent application No. 15,124/66.

An output digital form signal from the subtractor unit STR presenting the difference between the two digital number inputs is applied to a digital-to-analogue converter means DAC which again can be any suitable known form operative to convert the digital form difference number signal to one of analogue form wherein the signal amplitude is indicative of the difference number value and its polarity, positive or negative, is indicative of the positive or negative sign of the digital difference number, that is to say, whether the destination digit number is greater or less than the actual tool position number. The output from this converter means DAC is applied to a gate G14 which is initially inhibited by reason of the absence of a signal on lead 47. At this time gates G12X and G13X are also closed.

Output channel 21 of the tape reader TPR will provide an output signal as an operation step is under consideration. This signal, after a slight delay following the actual stepping on of the tape reader which brought the instruction into use, due to a delay circuit DL, causes a "go" trigger circuit GTR to be set "on" and the "on" output from the latter then provides a control signal to open gates G14 and G13X. The opening of gate G13X causes a gate inhibiting signal to be applied to gate G15X which then closes. The simultaneous opening of gate G14 allows the analogue error signal from the converter DAC, which signal represents by its amplitude and polarity the amount and sense of the difference between the actual tool position from its desired destination position to pass to a motor control circuit MCX by way of the gate G12X which is already open. The control circuit MCX may be of any suitable known form. For example, it may comprise a conventional servo control system controllable by the amplitude and sign of a control signal and operable to adjust the motor speed in accordance with the control signal amplitude and the motor drive direction in accordance with the control signal polarity. Such motor control circuit MCX controls the X-axis motor XM.

The motor XM for driving the tool in the X-axis direction now operates in the appropriate direction and at a speed which, although dependent upon the control signal amplitude, is subject to overriding control as to its maximum by the signalled maximum speed as set by the speed limiter SLX.

As the destination point signalled by the digits in channels 5–20 of the tape reader TPR is reached the analogue error signal derived from the converter DAC will decrease in amplitude and this causes progressive reduction of the speed of the motor XM. When the tool T reaches the particular sub-division of the smallest unit division signalled as the destination point, the output from the subtractor STR will fall to zero. Such zero voltage output causes a balance trigger circuit BTR to be operated to its "on" state and an output pulse derived from the "on" output of this trigger circuit is applied as a reset signal to the "go" trigger circuit GTR. Resetting of such trigger GTR causes closure of the gates G12X, G13X and G14. The closure of gate G14 results in removal of the error indicating output signal derived from the converter DAC from the control system MCX but the simultaneous opening of gate G15X due to the removal of the previous inhibiting signal from gate G13X causes the substitution therefor of the intermediate analogue waveform output WHS from the digital read out means ROX. Referring back to FIG. 5, the particular one of the group $WA/B \ldots wE/A$ which is thus made available will be determined by the output then available from the position transducer DTX. As already explained above, the tool T is, at this instant, within the unit subdivision signalled by the destination digits of the tape reader output. In consequence, the available holding signal WHS is one which changes sign when the tool T is exactly at the centre of the unit subdivision. The application of this signal to the control circuit MCX cause the motor XM to be operated in appropriate direction until the tool is so positioned that the applied waveform WHS is at the null point whereupon the motor stops. By this means the X-axis position of the tool is held at the desired destination point, with any necessary monitoring action to correct inadvertent displacement, whilst the tape reader TPR is released in readiness to be stepped on to the next instruction. Such stepping operation is initiated by a STEP output signal which is provided by the "off" output of trigger circuit GTR which, as just explained, has just been reset.

The stepping-on of the tape reader by the signal from the trigger circuit GTR over lead 42 to the stepping means 41 of the tape reader TPR causes the next punching position to be brought under the tape sensing means. If, as will usually be the case, such next position contains a further instruction, a further operation will then take place in a manner similar to that already described. Such next instruction may call for tool movement along either one of the two axes. In most cases it will call for movement of the tool along the opposite Y axis, for example, to reset the tool at a lesser radius from the workpiece centre in order to take a further longitudinal cut under the control of the following further instruction. When movement along the Y-axis is called for, channel 1 of the tape reader output does not contain a signal punching. In consequence the trigger circuit XTR reverts to its "off" state thereby setting the trigger circuit YTR to the "on" state.

Control of tool movement along the Y axis is effected in a manner precisely similar to that already described for the X axis but with the other motor YM and its associated and precisely corresponding control components. In FIG. 6, such corresponding components have been given corresponding references except for the substitution of the suffix Y instead of X.

The use of the intermediate analogue waveform WHS for effecting final location and subsequent holding of the desired tool position, in addition to achieving high accuracy by reason of the fact that the position is continuously maintained at the centre of the zone defined by the selected waveform also allows, firstly, some relaxation of the design tolerances in the digital-analogue control equipment since the latter need only bring about the approach of the tool to a position lying somewhere within the range of the chosen intermediate analogue signal and, secondly, the withdrawal from use of all of the digital control equipment. The latter can then, if necessary, used in connection with movement control on another axis.

Figure 7:
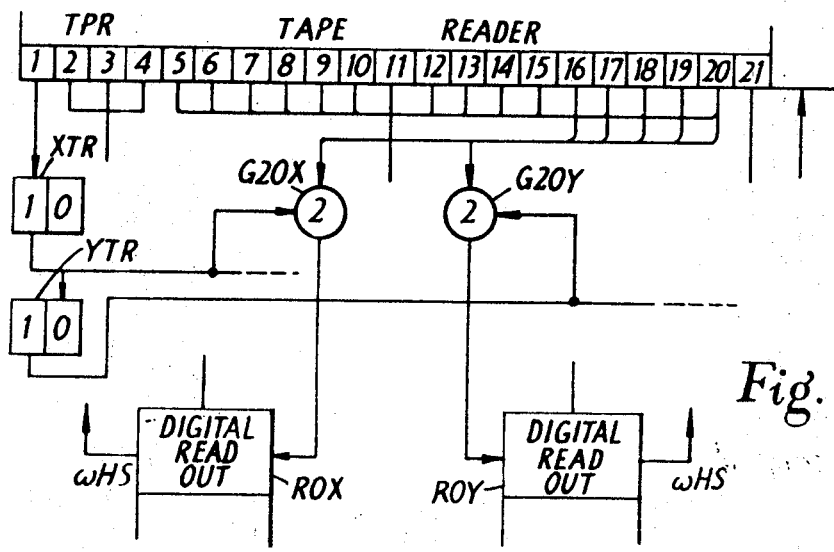
FIG. 7 is a fragmentary block schematic diagram showing a modified form of the system of FIG. 6.

FIG. 7 illustrates a modification of part of FIG. 6 which permits further relaxation of the requirements of the servo control arrangements and the balance detector means BTR which may comprise a Schmitt trigger type device having a limited amount of backlash between its change-over levels. In the arrangements of FIG. 6 just described, such balance detector must operate within the difference output signal range equivalent to one subdivision of the lowest order unit division. In the modified arrangement of FIG. 7, the control of the selection of the intermediate analogue waveform WHS applied to the chosen motor XM or YM is controlled by the signalled value of the least significant decimal digit of the instruction. Thus the number, defined by channels 16–20 of the output from the tape reader TPR, is fed either through gate G20X (opened when the X trigger circuit XTR is "on") or through gate G20Y (opened when the Y trigger circuit VTR is "on") to the related digital read-out means ROX or ROY. In the latter and referring again to FIG. 5, the controlling input signals to the buffer circuits B1, B2 . . . B5 are derived directly from the aforesaid tape reader channels. Thus buffer B1 will be supplied with signals corresponding to least significant digit instruction numbers "0" and "5", buffer B2 with signals corresponding to numbers "1" and "6", and so on. The tolerance of the balance detector means BTR may then be relaxed by a factor of nearly ten since the selected holding waveform wHS will be correct to drive the motor in the appropriate direction to reach the zero volt crossover point provided it is brought into use within ±5 least significant digits of the required destination. In the modification shown in FIG. 7 the balance detector BTR (FIG. 6) may be controlled by the output of the digital to analogue converter DAC (FIG. 6) to be operated whenever the amplitude of the output signal falls below a chosen amplitude level instead of, as in the arrangement of FIG. 6, when the difference signal output from the substractor STR reaches zero.

The various trigger circuits employed may be of any suitable known form while the different gate circiuts may likewise be of any suitable known type. As will be apparent from consideration of the character of the digital signals employed (parallel mode) many of the gate circuits are of the multiple channel type.

I claim:

1. A system for effecting point-to-point control of the movement of an object, such as a cutting tool, in a machine tool along at least one predetermined path by means of an instruction in digital form which comprises means for providing a digital form electrical destination signal indicative of the required destination position of said object, means operatively coupled with said object for moving said object along said predetermined path, at least one reversible electric motor coupled to and driving said means for moving said object along said predetermined path, absolute displacement position transducer means coupled to said object for providing a digital form electric position signal indicative of the actual position of said object along said path, signal comparison means operatively coupled with said destination signal providing means and with said transducer means and arranged to be supplied with said destination and position signals for providing an error output signal indicative of the difference value and the sense of difference between the actual and destination positions, motor control means operatively coupled with said motor and arranged to be controlled by said error signal for causing operation of said motor to move said object in a direction to reduce said difference value towards zero, balance detecting means operatively coupled with said comparison means and operable by said error signal to signal the reduction of said difference value below a predetermined, near-zero, amount and means operatively coupled with said balance detecting means, said motor control means and said transducer means and operable by said signal from said balance detecting means for transferring control of said motor control means to an analogue form holding signal derived from said transducer means, which analogue holding signal passes through a chosen datum level of amplitude, such as zero, when the object is in any position defined by the value of the least significant digit of said instruction whereby the object is thereafter continuously maintained in the signalled destination position.

2. A system according to claim 1 in which said object is movable along either of first and second mutually perpendicularly rectilinear paths and which comprises first and second reversible electric motors operatively coupled with said means for moving said object, first and second absolute displacement position transducer means coupled to said object for providing digital form electric position signals indicative of the actual position of said object along said paths, and first and second motor control means respectively operatively coupled with said motors for effecting instruction-controlled movement along said first and second paths respectively.

3. A system according to claim 2 which comprises a single instruction input means operatively coupled with said motors for operation with an instruction which also signals which of said first and second paths is to be used for movement to the destination defined therein.

4. A system according to claim 3 in which said instruction input means comprises a reader for punched tape carrying a plurality of successive instructions which can be made effective in turn automatically by means of stepping motion imparted to said tape following completion of each instruction.

5. A system according to claim 1 wherein said digital form instruction is operatively coupled with said motor or motors for signalling a maximum speed of operation of said electric motor or motors and which comprises signal controlled speed limiter means for said motor or each of said motors arranged for control by said maximum speed defining component of said instruction.

6. A system according to claim 3 wherein said signal comparison means is a single comparison means having first and second signal inputs, said first signal input operatively coupled to be supplied with said destination signal and said second signal input operatively coupled to be supplied with said position signal from either of said first and second absolute position displacement transducer means, and switching means controllable by said path defining signal of said instruction, said second signal input operatively coupled to be supplied with said position signal from either of said first and second absolute position displacement transducer means through said switching means.

7. A system according to claim 6 in which said signal comparison means comprises a digital number subtractor circuit.

8. A system according to claim 7 which comprises digital-to-analogue converter circuit means operatively coupled to convert the digital-form difference output from said subtractor circuit into an analogue form error signal.

9. A system according to claim 1 in which said transducer means are operatively coupled to provide a family of analogue holding signals having respective amplitude datum level crossing points which define the mid points of at least half of the unit displacement steps capable of being signalled by the least significant digits of any destination position number of the instruction and in which means are provided for selecting the appropriate one of said family of signals.

10. A system according to claim 9 in which said selection of the appropriate holding signal is effected by means operatively coupled with said operative instruction and controlled by the least significant digit portion of the operative instruction.

11. A machine tool having a control system according to claim 1.

12. A turning lathe having a control system according to claim 1 for controlling the position of a cutting tool thereof.

References Cited

UNITED STATES PATENTS

| | | |
|---|---|---|
| 2,947,929 | 8/1960 | Bower. |
| 3,063,311 | 11/1962 | Beckwith et al. |
| 3,117,263 | 1/1964 | MacDonald. |
| 3,324,364 | 6/1967 | Caruthers. |
| 3,414,785 | 12/1968 | Orahood et al. |

BENJAMIN DOBECK, Primary Examiner